United States Patent
Honma

(10) Patent No.: US 9,813,575 B2
(45) Date of Patent: Nov. 7, 2017

(54) IMAGE FORMING APPARATUS HAVING MEMORIZING CONTROL, IMAGE FORMING SYSTEM, AND IMAGE FORMATION CONTROL METHOD

(71) Applicant: Konica Minolta, Inc., Chiyoda-ku, Tokyo (JP)

(72) Inventor: Mikimasa Honma, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/659,979

(22) Filed: Mar. 17, 2015

(65) Prior Publication Data
US 2015/0271347 A1  Sep. 24, 2015

(30) Foreign Application Priority Data
Mar. 19, 2014 (JP) ................................ 2014-056899

(51) Int. Cl.
*G06F 3/12* (2006.01)
*H04N 1/00* (2006.01)

(52) U.S. Cl.
CPC ..... *H04N 1/00862* (2013.01); *H04N 1/00848* (2013.01)

(58) Field of Classification Search
None
See application file for complete search history.

(56) References Cited

U.S. PATENT DOCUMENTS

| 2002/0122582 A1* | 9/2002 | Masuda ................. G01N 21/88 382/141 |
| 2005/0284324 A1* | 12/2005 | Fukui .................. B41F 33/0045 101/484 |
| 2011/0019245 A1* | 1/2011 | Adachi ............. H04N 1/00002 358/448 |

FOREIGN PATENT DOCUMENTS

| JP | 7-135564 A | 5/1995 |
| JP | 2003-167832 A | 6/2003 |

(Continued)

OTHER PUBLICATIONS

Office Action (Notice of Reason for Rejection) dated Mar. 15, 2016, by the Japanese Patent Office in rresponding Japanese Patent Application No. 2014-056899, and an English Translation of the Office Action. (8 pages).

(Continued)

*Primary Examiner* — Henok A Shiferaw
(74) *Attorney, Agent, or Firm* — Buchanan Ingersoll & Rooney PC

(57) ABSTRACT

An image forming apparatus, includes an image forming section to form an image on a paper sheet based on image data; an output image reading section to read the image formed on the paper sheet by the forming section and to produce formed image data; a data memory section to memorize various kinds of data; an attribution information producing section to discriminate the contents of the formed image data and to produce attribution information which shows the attribute of the formed image data; and a control section to control image formation by the image forming section, reading by the output image reading section, and memorizing by the data memory section, wherein the control section controls the memorizing by the data memory section for formed image relating information in association (Continued)

with the formed image data based on the attribution information.

19 Claims, 13 Drawing Sheets

(56) References Cited

FOREIGN PATENT DOCUMENTS

| | | |
|---|---|---|
| JP | 2005-205722 A | 8/2005 |
| JP | 2006-007659 A | 1/2006 |
| JP | 2007-079901 A | 3/2007 |
| JP | 2010-130529 A | 6/2010 |

OTHER PUBLICATIONS

Office Action (Final Rejection) dated Oct. 11, 2016, by the Japanese Patent Office in corresponding Japanese Patent Application No. 2014-056899, and an English Translation of the Office Action. (4 pages).

\* cited by examiner

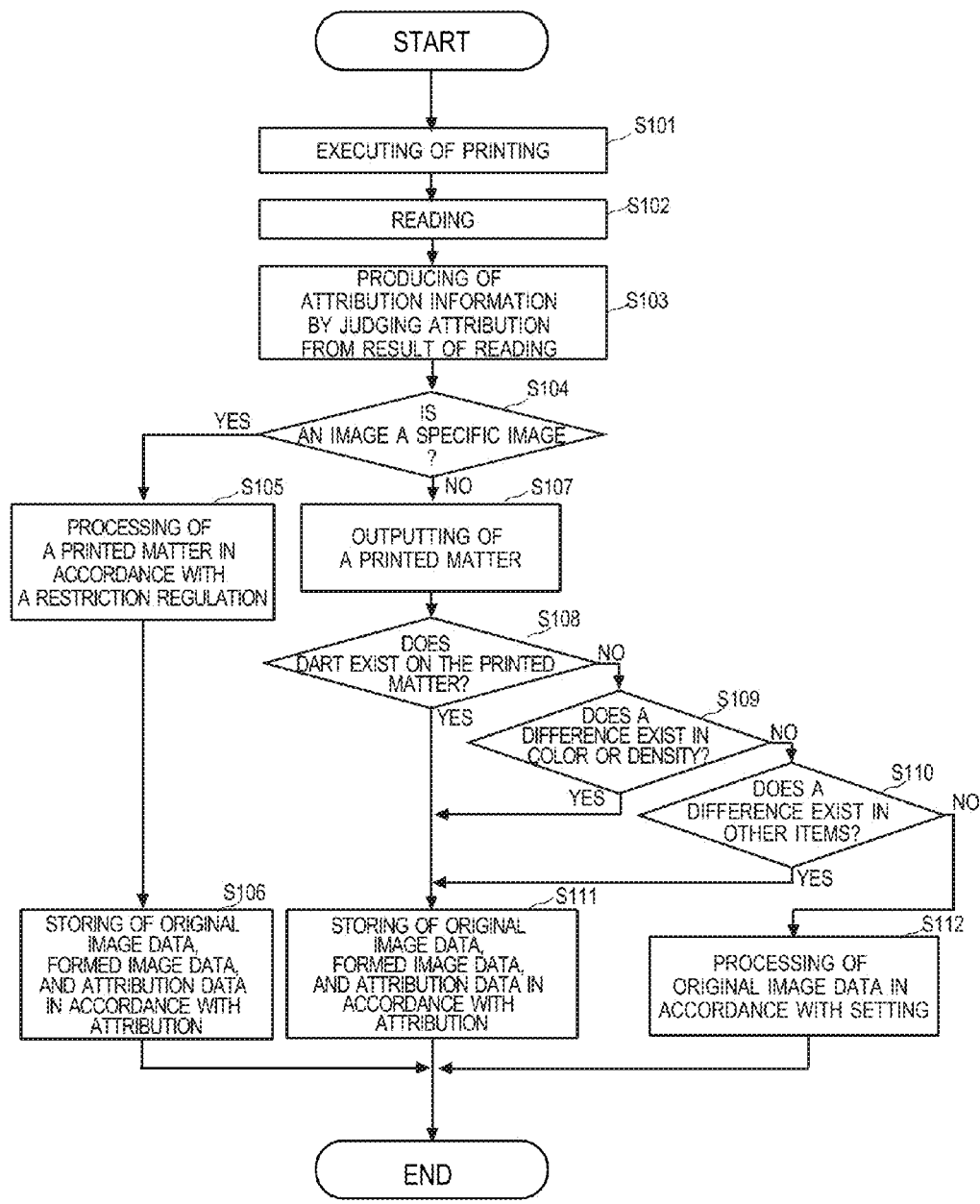

Fig. 6

| CONTROL ATTRIBUTION | CONTENTS OF THE STORAGE | STORAGE DESTINATION | RESTRICTION |
|---|---|---|---|
| DIRT BEING EXISTING | ORIGINAL IMAGE DATA (ALL THE PAGES), FORMED IMAGE DATA ON THE PAGE CORRESPONDING TO "DIRT BEING EXISTING", ATTRIBUTION INFORMATION, | FOLDER FOR DEFECT IMAGE DETECTION | WITHOUT RESTRICTION |
| DIFFERENCE IN COLOR OR DENSITY | IMAGE DATA, FORMED IMAGE DATA, ATTRIBUTION INFORMATION | FOLDER FOR DEFECT IMAGE DETECTION (COLOR AND DENSITY) | WITHOUT RESTRICTION |
| DIFFERENCE IN OTHER ITEMS | IMAGE DATA, FORMED IMAGE DATA, ATTRIBUTION INFORMATION | FOLDER FOR DEFECT IMAGE DETECTION (A DIFFERENCE IN OTHER ITEMS) | WITHOUT RESTRICTION |
| CORRESPONDING TO SPECIFIC IMAGE | FORMED IMAGE DATA ON A PAGE CORRESPONDING TO THE SPECIFIC IMAGE WITH THE ATTRIBUTION | FOLDER FOR SPECIFIC IMAGES | GENERAL USER IS PROHIBITED FROM PERUSING OR DISPLAYING THE STORED FORMED IMAGE DATA, STORAGE IN WHICH THE FORMED IMAGE DATA ARE STORED IN A STATE OF BEING DESTROYED |
| NO CORRESPONDENCE | IN ACCORDANCE WITH THE SETTING FOR THE JOB OR THE SETTING CORRESPONDING TO THE ATTRIBUTION | | |

Fig. 9

| EXTENT / ATTRIBUTION | EXTENT 1 (0% - 20%) | EXTENT 2 (21% - 40%) | EXTENT 3 (41% - ) |
|---|---|---|---|
| DIRT BEING EXISTING | REDUCTION RATIO TO 0.75 TIMES | REDUCTION RATIO TO 0.5 TIMES | REDUCTION RATIO TO 0.25 TIMES |
| DIFFERENCE IN COLOR OR DENSITY | REDUCTION RATIO TO 1.0 TIME | REDUCTION RATIO TO 0.75 TIMES | REDUCTION RATIO TO 0.5 TIMES |
| DIFFERENCE BEING EXISTING IN OTHER ITEMS | REDUCTION RATIO TO 0.5 TIMES | REDUCTION RATIO TO 0.5 TIMES | REDUCTION RATIO TO 0.5 TIMES |
| SPECIFIC IMAGE | REDUCTION RATIO TO 0.25 TIMES | | |

IMAGE FORMING APPARATUS HAVING MEMORIZING CONTROL, IMAGE FORMING SYSTEM, AND IMAGE FORMATION CONTROL METHOD

The present application claims the priority under the Paris Convention based on Japanese Patent Application No. 2014-56899 filed on Mar. 19, 2014, in accordance with the provisions in the United States Patent Law.

BACKGROUND OF THE INVENTION

Field of the Invention

The present invention relates to an image forming apparatus, an image forming system, and an image formation control method, and, in particular, relates to a technique to perform appropriately image formation in association with reading of a paper sheet as an output matter on which an image is formed.

Description of Related Art

There exists an image forming system in which a reading apparatus is connected to a latter stage of an image forming apparatus configured to form an image on a paper sheet. The reading apparatus is configured to read out an output image. Accordingly, in this image forming system, it is possible to read an image formed on a paper sheet with the reading apparatus. Further, there exists an image forming apparatus in which a reading section is disposed at a downstream side of an image forming section configured to form an image on a paper sheet. The reading section is configured to read out an image formed on a paper sheet.

In such an image forming apparatus and an image forming system, it is possible to adjust an image formation position and an image quality by referring to a reading result after image formation. Further, in such an image forming apparatus and an image forming system, it is possible to detect defective images. Further, in such an image forming apparatus and an image forming system, it is possible to leave an image formation result as an image for confirming an evidence.

As such a kind of techniques, various kinds of relevant proposals have been made by patent documents, such as Japanese Unexamined Patent Publication Nos. 7-135564 and 2010-130529.

SUMMARY OF THE INVENTION

In the above Japanese Unexamined Patent Publication No. 7-135564, in the case where a read image at the time of reading a document is judged as a specific image, user identification information is memorized in a recording section at the inside of an image forming apparatus. In addition, a date, a size and the image data are also memorized collectively in a memory section at the inside of the image forming apparatus. The above technique relates to the processing at the time of reading a document with a scanner so as to produce scanning data, and does not relate to the processing for the data after an image has been formed and output.

In the above Japanese Unexamined Patent Publication No. 2010-130529, it is judged whether a dot pattern for prohibition exists in image data before being converted into data for output. In the case where the dot pattern for prohibition exists, respective pixels of the image data are converted into the same pixel value so as to produce destructive data, and then memorized. The above technique relates to the processing at the time of reading a document with a scanner so as to produce scanning data, and does not relate to the processing for the data after an image has been formed and output.

In addition to the above techniques, although there exist many processing techniques with regard to scanning data, there exists no processing technique to perform judgment and control by using image data (hereafter, referred to "the formed image data") acquired by reading an image after having been formed and output. Also, there exists no processing technique to control the memorizing of the formed image data based on the formed image data acquired by reading an image formation output.

Incidentally, in an image forming apparatus and an image forming system, an intended image may not be formed due to failures in an image formation control program. Examples of such a case where an intended image is not formed, include a case where the position and orientation of an image on a paper sheet is different from the designation, and a case where pages are output in the different order of pages.

Such failures cannot be detected from image data before the execution of image formation, and becomes recognizable for the first time after the image formation. Therefore, also in order to take a counter measure later, it is preferable to memorize the formed image data image together with the information on an image formation result in an image forming apparatus itself which has output the image. For example, in the case where a serviceman is called due to the reason that an output result of image formation is abnormal, there may be a possibility that it becomes difficult to identify the abnormal image output from which apparatus among a plurality of image forming apparatuses.

Further, in the case of an image (an output-prohibited image) prohibited from being output, such as valuable stock certificates and an image (a careful handling-needed image) to be handled with care, such as secret documents, it is preferable to grasp the matter that such an image has been output from which apparatus among a plurality of image forming apparatuses, or such an image has been tried to be output from which apparatus.

Incidentally, there exists a technique to read the content of a formed image with a reading section disposed at a back stage of an image forming section and to memorize it as an evidence image. However, if all the output images are memorized as an evidence image for failures and an output-prohibited image with low frequency occurrence in which when they take place is difficult to prospect, even if a memory section with a large capacity is provided, the memory capacity may become shortage.

Further, it may be possible to leave an evidence image as a reduced image so as to reduce a memory capacity. However, even in this case, a memory section with a large capacity is still needed. On the other hand, if an evidence image is left as a reduced image so as to reduce a memory capacity, with the reduction, it may be also expected that it becomes difficult to confirm the failures.

An object of the present invention is to realize an image forming apparatus capable of administrating an image subjected to image formation appropriately in response to the situation of the image formation, an image forming system, and an image formation control method.

(1) An image forming apparatus which reflects one aspect of the present invention, includes:

an image forming section to form an image on a paper sheet based on image data;

an output image reading section to read the image formed on the paper sheet by the image forming section and to produce formed image data;

a data memory section to memorize various kinds of data;

an attribution information producing section to discriminate the contents of the formed image data and to produce attribution information which shows the attribute of the formed image data; and a control section to control image formation by the image forming section, reading by the output image reading section, and memorizing by the data memory section;

wherein the control section controls the memorizing by the data memory section for formed image relating information in association with the formed image data based on the attribution information.

(2) In the above (1), the control section controls whether to memorize the formed image relating information in the data memory section or not.

(3) In the above (1) to (2), the formed image relating information includes the image data, the formed image data, and the attribution information, and the control section controls based on the attribution information whether to memorize any of the image data, the formed image data, and the attribution information in the data memorizing section.

(4) In the above (3), when any multiple items of the image data, the formed image data, and the attribution information are memorized in the data memorizing section, the control section controls the multiple items so as to be memorized in a state of being correlated with each other.

(5) In the above (1) to (4), the attribution information producing section produces the attribution information by comparing the image data with the formed image data.

(6) In the above (1) to (5), the attribution information producing section produces the attribution information by comparing a predetermined specific pattern with the formed image data.

(7) In the above (6), the specific pattern is constituted so as to include a pattern corresponding to the whole or a part of a predetermined image, and the attribution information producing section produces whether a coincidence exists between the specific pattern and the formed image data or not as the attribution information.

(8) In the above (1) to (7), the attribution information producing section compares the image data with the formed image data and makes the attribution information include extent information showing an extent of coincidence or non-coincidence.

(9) In the above (8), the control section controls a magnification of the formed image data to be memorized in the data memory section based on the extent information included in the attribution information.

(10) In the above (8), the image forming apparatus further includes a display section to display various kinds of information, and the control section controls a display magnification at the time of displaying the formed image data on the display section based on the extent information included in the attribution information.

(11) In the above (8), the image forming apparatus further includes a display section to display various kinds of information, and the control section controls the number of displayed images at the time of displaying the formed image data on the display section based on the extent information included in the attribution information.

BRIEF EXPLANATION OF THE DRAWINGS

FIG. 5 is a flow chart showing operations of the embodiment.

FIG. 6 is an explanatory drawing for explaining an example of operations of the embodiment.

FIG. 9 is an explanatory drawing for explaining an example of operations of the embodiment.

DETAILED DESCRIPTION OF THE PREFERRED EMBODIMENT

Hereinafter, with reference to the drawings, description will be given in detail to an embodiment which realizes efficiently reading of a paper sheet (output matter) on which an image is formed in an image forming apparatus or an image forming system.

[Constitution of an Image Forming Apparatus]

Figure 1:
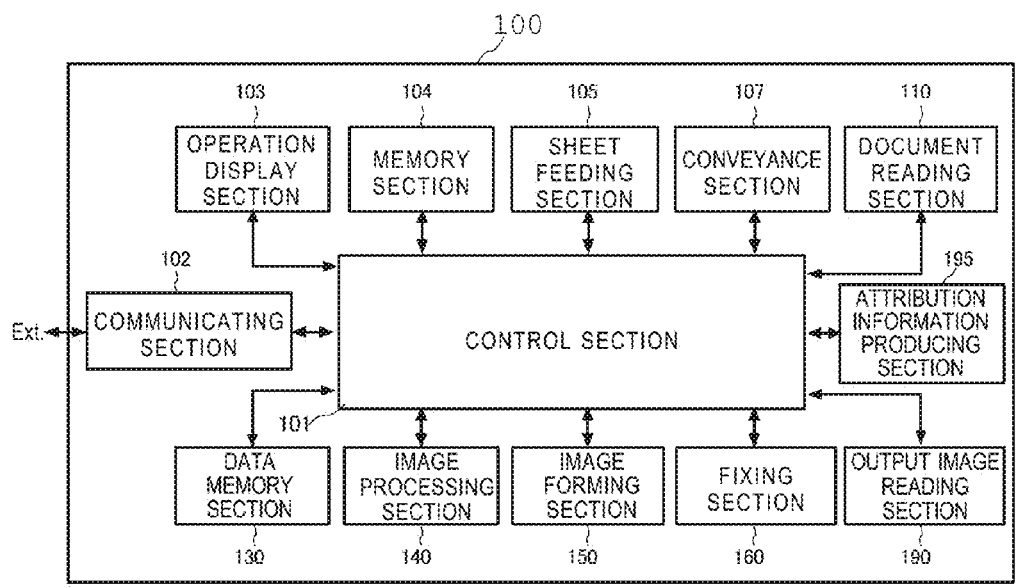
FIG. 1 is a constitution diagram showing the constitution of an image forming apparatus of an embodiment.
Figure 2:
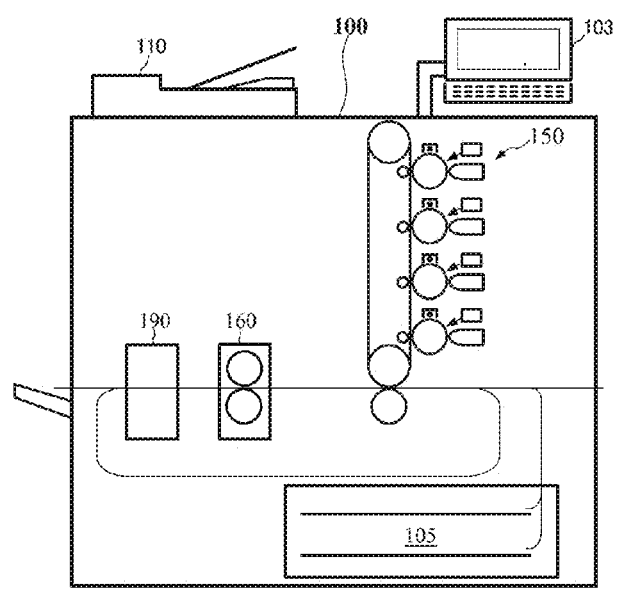
FIG. 2 is a constitution diagram showing the constitution of an image forming apparatus of the embodiment.

Here, description is given in detail to an example of the constitution of an image forming apparatus based on FIG. 1 and FIG. 2. In FIG. 1 and FIG. 2, description is given to an image forming apparatus 100 which incorporates therein an output image reading section.

The image forming apparatus 100 is constituted to include a control section 101, a communicating section 102, an operation display section 103, a memory section 104, a sheet feeding section 105, a conveyance section 107, a document reading section 110, a data memory section 130, an image processing section 140, an image forming section 150, a fixing section 160, an output image reading section 190, and an attribution information producing section 195.

Here, the control section 101 is configured to control the respective sections in the image forming apparatus 100. The communicating section 102 is configured to communicate with other devices (external devices) connected to the image forming apparatus 100. The operation display section 103 is configured to receive an operational input by a user and to display a state of the image forming apparatus 100. The memory section 104 is configured to memorize various kinds of setting. The sheet feeding section 105 is configured to feed a paper sheet separately from paper sheets stored in a paper feed tray. The conveyance section 107 is configured to convey a paper sheet within the image forming apparatus 100.

The document reading section 110 is configured to read an image on a document with an image sensor and to produce document image data. The data memory section 130 is configured to memorize image data and various kinds of data at the time of forming an image. The image processing section 140 is configured to perform various kinds of image processing required for image formation. The image forming section 150 is configured to form an image on a paper sheet based on an image formation order and image data. The fixing section 160 is configured to stabilize an image formed with toner on a paper sheet by heat and pressure. The output image reading section 190 is configured to read an image (an output matter) formed on a paper sheet with an image sensor and to produce the formed image data. The attribution information producing section 195 is configured to discriminate the content of the formed image data and to produce attribution information which shows the attribute of the formed image data. As shown in FIG. 2, the image forming section 150 is constituted to include an image carrying body, an electrification section, an exposure section, a development section, an intermediate transfer body, and a transfer section.

Here, on the image carrying body, an electrostatic latent image and a toner image are formed. The electrification section is configured to electrically charge the image carrying body with a predetermined electric potential. The exposure section is configured to perform exposure based on image data to the electrically-charged image carrying body so as to form an electrostatic latent image. The development section is configured to develop the electrostatic latent image into a toner image. On the intermediate transfer body, color toner images on the respective image carrying bodies are combined. The transfer section is configured to transfer the combined toner image on the intermediate transfer body onto a paper sheet.

In this embodiment, the image forming section 150 to form a color image is exemplified. However, an image forming section to form a monochromatic image may be employed. Also, the structure of an electrophotographying system is exemplified as the image forming section 150. However, the structure should not be limited to it, and the other systems, such as an ink jet system may be employed.

The output image reading section 190 uses a line sensor as the image sensor, is equipped with a function to read a paper sheet being conveyed on a condition that an image is formed on the paper sheet, and is configured to produce the formed image data. Further, the output image reading section 190 is arranged at a downstream side of the fixing section 160 in the sheet conveying direction, and is constituted to read an image on a paper sheet being conveyed to be output. The attribution information producing section 195 may exist in the inside of the output image reading section 190, or may exist in the inside of the control section 101.

[Constitution of an Image Forming System]

Figure 3:
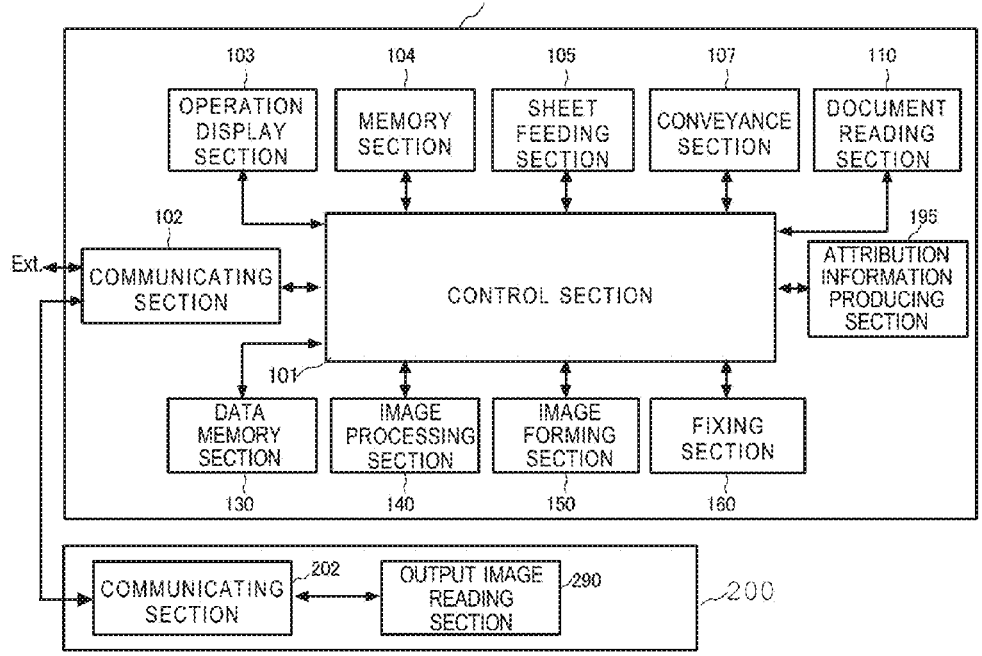
FIG. 3 is a constitution diagram showing the constitution of an image forming system of the embodiment.
Figure 4:
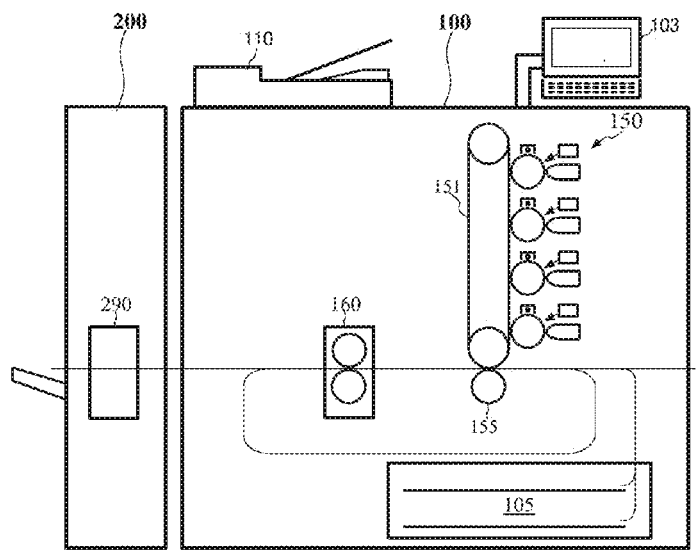
FIG. 4 is a constitution diagram showing the constitution of an image forming system of the embodiment.

Here, based on FIG. 3 and FIG. 4, description is given in detail to an example of the constitution of an image forming system. In FIG. 3 and FIG. 4, description is given to an image forming system which includes an image forming apparatus 100 and an output image reading apparatus 200.

Here, the image forming apparatus 100 is similar to that shown in FIGS. 1 and 2, and is in a condition of not having the output image reading section. In FIGS. 1 and 2 and FIGS. 3 and 4, the same number is given to the same component, and the duplicate explanation is omitted.

The output image reading apparatus 200 is arranged at a downstream side of the image forming apparatus 100 in the sheet conveying direction. The output image reading apparatus 200 is constituted to include a communication section 202 and an output image reading section 290. The output image reading apparatus 200 is configured to read an image formed on a paper sheet to be output while the paper sheet is being conveyed.

The output image reading apparatus 200 may be incorporated in a rear unit of the fixing section 160 as a rear unit of the image forming apparatus 100. A cooling device to cool a paper sheet heated in the fixing may be disposed between the fixing section 160 and the output image reading section 190, or 290.

Further, the output image reading apparatus 200 may be also incorporated in an intermediate device to perform reversing of a paper sheet or in a post processing device to perform various kinds of post processing, such as production of a booklet. Furthermore, the attribution information producing section 195 may be disposed in the output image reading apparatus 200, not in the inside of the image forming apparatus 100.

[Handling of Attribution Information and Memory Data]

The attribution information producing section 195 is configured to compare image data becoming the original of image formation or a predetermined specific pattern with the formed image data, and to produce attribution information including information of the extent of coincidence or non-coincidence.

The specific pattern means an image prohibited from being output (hereafter, referred to an output-prohibited image), such as valuable stock certificates, a mark image such as a secret mark (hereafter, referred to a careful handling-needed partial image) contained in an image (hereafter, referred to a careful handling-needed image) to be handled with care, such as secret documents.

Here, examples of the attribution information include the following matters:

"Dirt being existing" in which certain dirt adheres to the formed image data.

"Difference being existing in color or density" in which a difference in color or density is caused in the formed image data.

"Difference being existing in other items" in which a difference is caused in position, orientation, or order in images of the formed image data.

"Corresponding to a specific image" in which an image of the formed image data corresponds to an output-prohibited image or a careful handling-needed image.

As mentioned later in this embodiment, the control section 101 controls memorizing in the data memory section 130 with regard to the formed image relating information relevant to the formed image data based on the attribution information.

Here, examples of the formed image relating information include the image data becoming the original of image formation, the formed image data produced by the output image reading section 190, and the attribution information. Further, the control of the memorizing in the data memory section 130 with regard to the formed image relating information corresponds to memorizing or not memorizing, reducing at the time of memorizing, choosing the contents to be memorized, and the like.

[First Operation Example of an Image Forming Apparatus and an Image Forming System]

Hereafter, description is given to the first operation example of an image forming apparatus and an image forming system with reference to a flow chart shown in FIG. 5 and the following figures. Here, the first operation example is described based on the specific example of the image forming apparatus shown in FIG. 1 and FIG. 2.

Upon receipt of an instruction from the operation display section 103 or an external device, the control section 101 controls the image forming section 150 to form an image on a paper sheet fed from the sheet feeding section 105 with regard to the instructed image formation job (Step S101 in FIG. 5). Further, the control section 101 controls the image processing section 140 to perform required image processing as required.

The control section 101 controls the respective sections to convey toward the fixing section 160 with regard to a paper sheet on which an image is formed in the image forming section 150. With this, the image on the paper sheet is processed so as to be stabilized by heat and pressure of the fixing section 160.

Further, the control section 101 controls the output image reading section 190 to read out the image on the paper sheet being conveyed after having been processed by the fixing section 160 (Step S102 in FIG. 5). The output image reading section 190 produces formed image data by reading out the image on the paper sheet being conveyed, and the output image reading section 190 sends the formed image data to the control section 101.

Here, the control section 101 sends a specific pattern, original image data becoming the original of image formation, and the formed image data to the attribution information producing section 195. Then, the control section 101 controls the attribution information producing section 195 to compare the formed image data with the original image data so as to discriminate whether a difference exists, to compare the formed image data with the specific pattern so as to discriminate whether a coincidence exists, and to produce discrimination information (Step S103 in FIG. 5).

When the attribution information producing section 195 judges by comparing the formed image data with the original image data such that a difference exists, the attribution information producing section 195 produces attribution information of any one of "Dirt being existing", "Difference being existing in color or density" and "Difference being existing in other items". Further, when the attribution information producing section 195 judges by comparing the formed image data with the specific pattern such that a coincidence exists, the attribution information producing section 195 produces attribution information of "Corresponding to a specific image".

Here, when the attribution information producing section 195 judges by comparing the formed image data with the specific pattern such that a coincidence exists (YES at Step S104 in FIG. 5), the control section 101 processes the paper sheet (a printed matter) on which the image is formed, in according with a predetermined restrictive regulation (Step S105 in FIG. 5). The specific image corresponds to an output-prohibited image such as valuable stock certificates and a careful handling-needed image, such as secret documents.

In the case where a difference exists between the formed image data and the original image data, since the processing in the output-prohibited image or the careful handling-needed image is to be performed with priority, whether the formed image data are coincident with the specific pattern is judged with priority, and then the processing is advanced.

For example, if the formed image data correspond to the output-prohibited image, the control section 101 performs control such that the paper sheet is conveyed to a sheet discharging section (not shown) disposed at the inside of the image forming apparatus 100 so at to prevent a general user from taking out the paper sheet, or that the operations of the image forming apparatus 100 are stopped with an alarm so at to prevent a general user from carrying out the paper sheet.

Further, if the formed image data correspond to the careful handling-needed image, the control section 101 performs control such that, in accordance with the authority of the user who is performing log-in, the paper sheet is made to be output as it is, or that the user is prevented from carrying out the paper sheet by conveying the paper sheet to a sheet discharging section (not shown) disposed at the inside of the image forming apparatus 100 or by stopping the operations of the image forming apparatus 100 with an alarm.

Successively, the control section 101 performs control so as to store any of the image data, the formed image data, and the attribution information in the data memory section 130 in accordance with the attribution information of "Corresponding to a specific image" (Step S106 in FIG. 5). That is, the control section 101 performs control to select any of the image data, the formed image data, and the attribution information in accordance with the content of the attribution information and to store on a state of being correlated in the data memory section 130.

FIG. 6 is an explanatory diagram showing an example of the contents of the attribution information and the contents of the storage control in a state of a list. If the attribution information is "Corresponding to a specific image", the control section 101 controls so as to correlate the formed image data on a page corresponding to the specific image with the attribution information and to store on a restriction-attached state in a folder for specific images (refer to FIG. 7) of the data memory section 130 (refer to the control content of the attribute of "Corresponding to a specific image" in FIG. 6).

Examples of the restrictions in the case of "Corresponding to a specific image" include prohibition in which a general user is prohibited from perusing or displaying the stored formed image data, and storage in which the formed image data are stored in a state of being destroyed partially so as not to be reused. In the formed image data stored in the folder for specific images shown in FIG. 7, triangular wave-like hatching is applied to the formed image data by the control of the control section 101. For this reason, the formed image data are made in a state of being not able to be reused. Further, in the case of "Corresponding to a specific image", since it is not necessary to reuse, the original image data are not stored. However, in order to leave as a proof the fact that the specific image has been output, the original image data may be set so as to be stored.

Further, when the attribution information producing section 195 judges by comparing the formed image data with the specific pattern such that a coincidence does not exist (NO at Step S104 in FIG. 5), the control section 101 controls the respective sections of the image forming apparatus 100 so as to deliver the paper sheet (printed matter) on which the image is formed, to a sheet delivery section (Step S107 in FIG. 5).

Here, when the attribution information producing section 195 compares the formed image data with the original image data and judges as a difference such that "dirt" exists in the formed image data (YES at Step S108 in FIG. 5), the attribution information producing section 195 produces the attribution information of "Dirt being existing".

Successively, the control section 101 controls in accordance with the attribution information of "Dirt being existing" so as to store the image data, the formed image data, and the attribution information in the data memory section 130 (Step S111 in FIG. 5). That is, the control section 101 performs control in accordance with the contents of the attribution information so as to select any of the image data, the formed image data, and the attribution information and to store in a state of being correlated in the data memory section 130.

Figure 7:
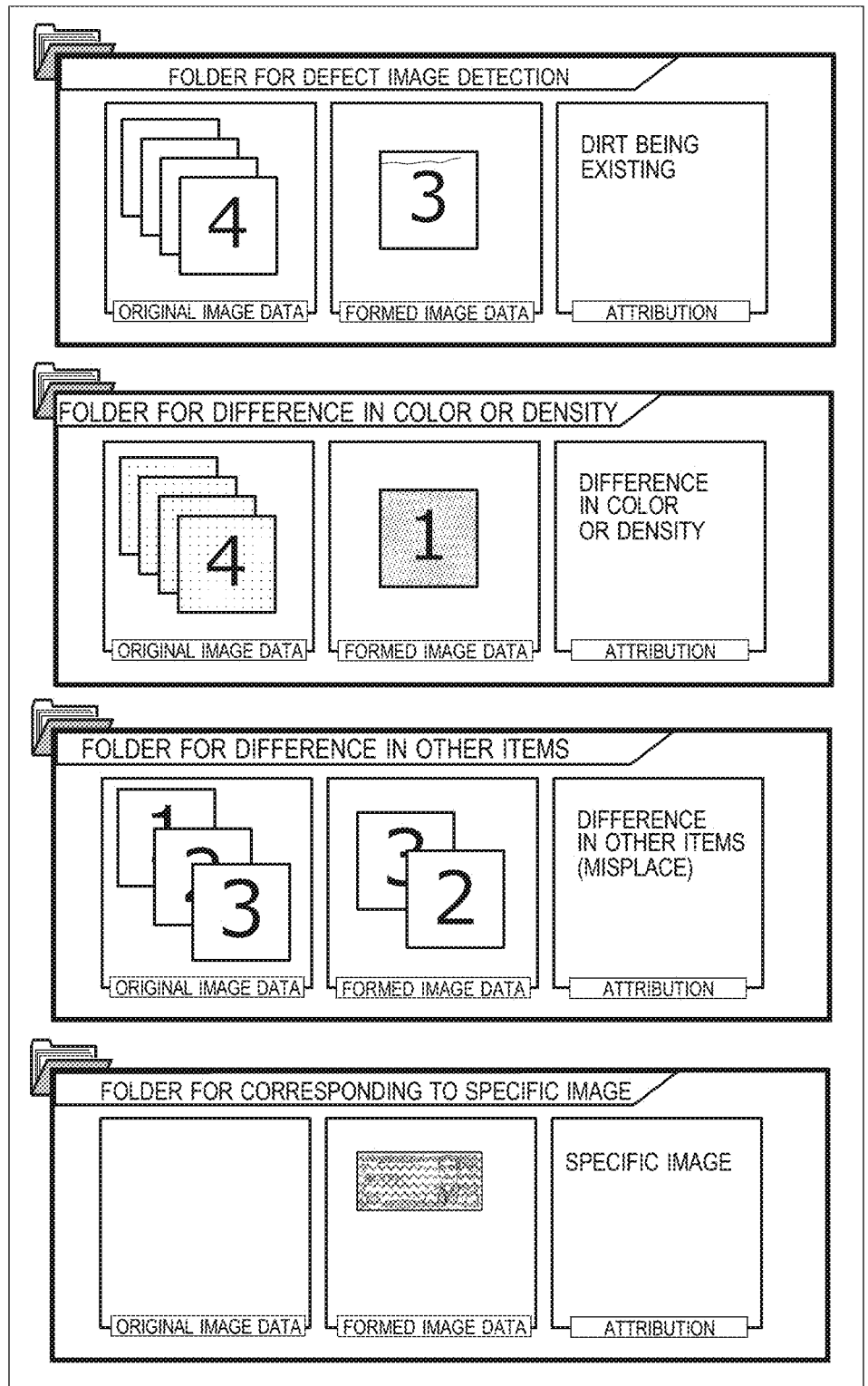
FIG. 7 is an explanatory drawing for explaining an example of operations of the embodiment.

When the attribution information is "Dirt being existing", the control section 101 controls so as to correlate the original image data (all the pages), with the formed image data on the page corresponding to "Dirt being existing", and the attribution information, and to store in "a folder for defect image detection (dirt)" (refer to FIG. 7) in the data memory section 130 (refer to the control content of the attribute of "Dirt being existing" in FIG. 6). FIG. 7 shows a specific example in the case where line-shaped dirt is caused on the third page. In this case, restrictions for the data like in the case of "Corresponding to a specific image" are not applied. Conversely, in order to contribute to find out the cause of fault, the original image data are made to be stored.

Further, here, when the attribution information producing section 195 compares the formed image data with the original image data and judges as a difference such that "a difference in color or density" exists in the formed image data (NO at Step S108, and YES at S109 in FIG. 5), the attribution information producing section 195 produces the attribution information of "Difference being existing in color or density".

Successively, the control section 101 controls in accordance with the attribution information of "Difference being existing in color or density" so as to store the image data, the formed image data, and the attribution information in the data memory section 130 (Step S111 in FIG. 5). That is, the control section 101 performs control to select any of the image data, the formed image data, and the attribution information in accordance with the content of the attribution information and to store on a state of being correlated in the data memory section 130.

When the attribution information is "Difference being existing in color or density", the control section 101 controls so as to correlate the original image data (all the pages), with the formed image data on the page corresponding to an image of "Difference being existing in color or density", and the attribution information, and to store in "a folder for defect image detection (color and density)" (refer to FIG. 7) in the data memory section 130 (refer to the control content of the attribute of "Difference being existing in color or density" in FIG. 6). FIG. 7 shows a specific example in the case where a difference in color or density is caused on the first page. In this case, restrictions for data like in the case of "Corresponding to a specific image" are not applied. Conversely, in order to contribute to find out the cause of fault, the original image data are made to be stored.

Further, here, when the attribution information producing section 195 compares the formed image data with the original image data and judges as a difference such that "a difference in other items" exists in the formed image data (NO at Step S108, NO at Step S109, and YES at S110 in FIG. 5), the attribution information producing section 195 produces the attribution information of "Difference being existing in other items".

Successively, the control section 101 controls in accordance with the attribution information of "Difference being existing in other items" so as to store the image data, the formed image data, and the attribution information in the data memory section 130 (Step S111 in FIG. 5). That is, the control section 101 performs control to select any of the image data, the formed image data, and the attribution information in accordance with the content of the attribution information, and to store on a state of being correlated in the data memory section 130.

When the attribution information is "Difference being existing in other items", the control section 101 controls so as to correlate the original image data (all the pages), with the formed image data on the page corresponding to an image of "Difference being existing in other items", and the attribution information, and to store in "a folder for defect image detection (a difference in other items)" (refer to FIG. 7) in the data memory section 130 (refer to the control content of the attribute of "Difference being existing in other items" in FIG. 6). FIG. 7 shows a specific example in the case where the second page and the third page are output on a state that the respective orders of the second page and the third page are misplaced. In this case, restrictions for data like in the case of "Corresponding to a specific image" are not applied. Conversely, in order to contribute to find out the cause of fault, the original image data are made to be stored.

Further, here, when the attribution information producing section 195 compares the formed image data with the original image data and judges such that no difference exists in the formed image data (NO at Step S108, NO at Step S109, and NO at S110 in FIG. 5), the attribution information producing section 195 produces the attribution information of "No correspondence".

In this case, the control section 101 controls in accordance with the attribution information of "No correspondence" so as to store or not to store any of the formed image relating information in the data memory section 130 in accordance with the setting for the job or the setting corresponding to the attribution information of "No correspondence" (Step S112 in FIG. 5). Since a folder corresponding to the attribution information of "No correspondence" is not prepared, FIG. 7 shows a specific example in which the original image data, the formed image data, and the attribution information are not stored in the case of the attribution information of "No correspondence".

[Second Operation Example of an Image Forming Apparatus and an Image Forming System]

Figure 8:
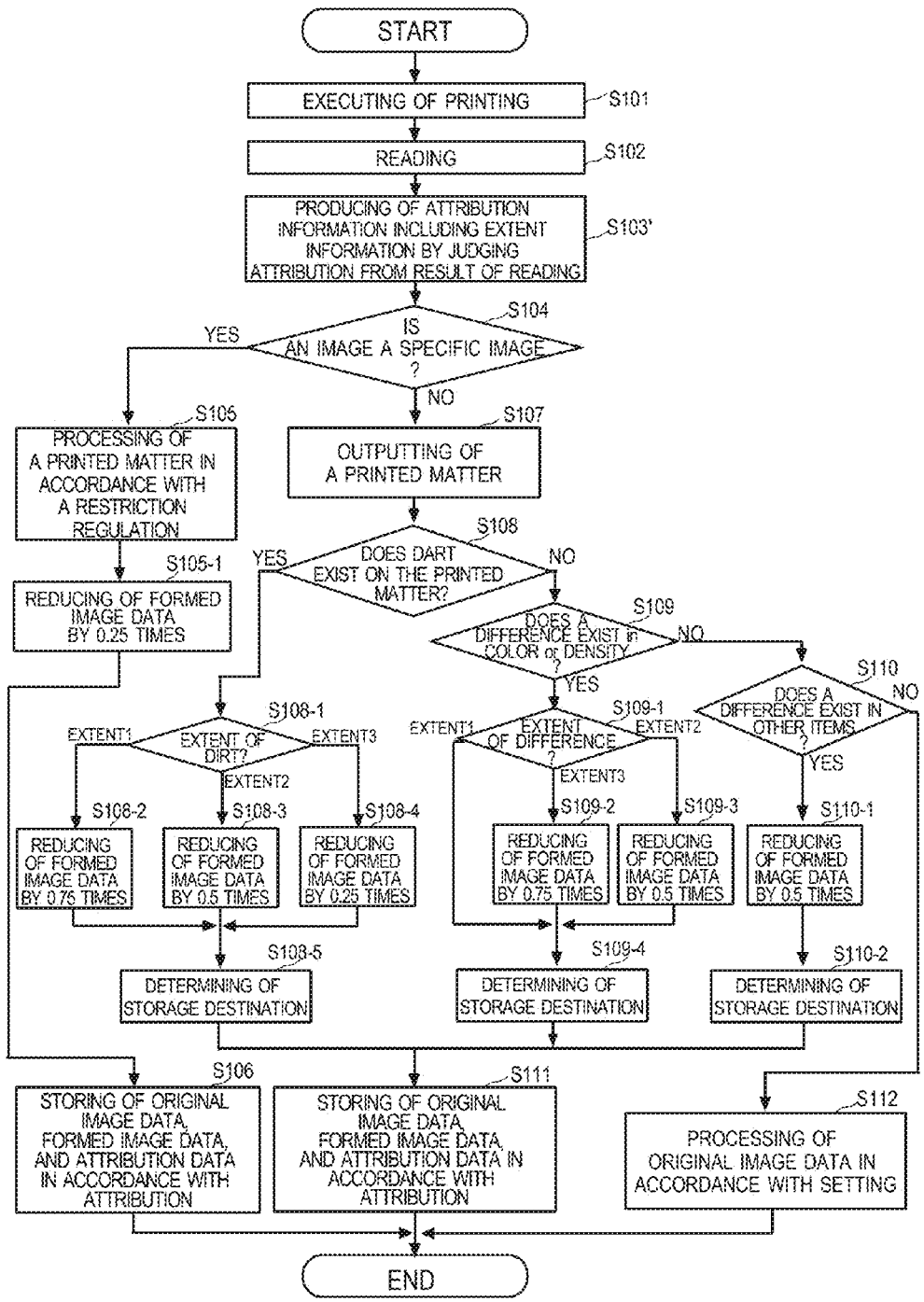
FIG. 8 is a flow chart showing operations of the embodiment.

Hereafter, description is given to the second operation example of an image forming apparatus and an image forming system with reference to a flow chart shown in FIG. 8 and the following figures. Here, the second operation example is described based on the specific example of the image forming apparatus shown in FIG. 1 and FIG. 2.

The second operation example is characterized in that the magnification of the formed image data to be memorized in the data memory section 130 is controlled based on extent information contained in attribution information. Further, in the flow chart shown in FIG. 8 with reference to the second operation example, the same step number is given to the portion of the same step content as that in the flow chart of FIG. 5 with reference to the first operation example, the duplicate explanation is omitted, and the description is given by focusing on difference points.

The control section 101 controls the attribution information producing section 195 to compare the formed image data with the original image data so as to discriminate whether a difference exists, to compare the formed image data with a specific pattern so as to discriminate whether a coincidence exists, and to produce discrimination information in a state of containing extent information which shows the extent of non-coincidence or coincidence (Step S103' in FIG. 8).

When the attribution information producing section 195 judges by comparing the formed image data with the original image data such that a difference exists, the attribution information producing section 195 produces attribution information of any one of "Dirt being existing", "Difference being existing in color or density", and "Difference being existing in other items". Further, when the attribution information producing section 195 judges by comparing the formed image data with the specific pattern such that a coincidence exists, the attribution information producing section 195 produces attribution information of "Corresponding to a specific image".

Here, after the attribution information producing section 195 compares the formed image data with the original image data, the attribution information producing section 195 produces the attribution information so as to include the following ratio as the extent information depending on the comparison results. When the comparison result is that dirt exists, the attribution information includes the ratio of an area on which dirt is caused to the whole of the paper sheet. When the comparison result is that a difference in color or density exists, the attribution information includes the ratio of an area on which a difference in color or density is caused to the whole of the paper sheet. When the comparison result is that a difference in other items exists, the attribution information includes the ratio of the number of pages on which a difference in other items is caused to the number of the whole pages. Here, a technique to multiple an area on which a difference in color or density is caused with a ratio of a difference in color or density (a color difference or a density difference) may be employed.

As such extent information, instead of the absolute value of a ratio, as shown in FIG. 9, it may be preferable to employ the stepwise-classified extent information, such as the extent 1 for 0 to 20%, the extent 2 for 21 to 40%, and the extent 3 for 41 to 100%.

Then, in accordance with the extent, a reduction ratio for the formed image data to be stored in each item of "Dirt being existing", "Difference being existing in color or density", and "Difference being existing in other items" is determined beforehand. The reduction ratio is determined so as to enable to confirm later without waste various kinds of faults, such as dirt, a difference in color or density, and a difference in other items, in which an intended image is not output. For example, in the case where the dirt corresponds to the extent 3, even if the formed image data are reduced by 0.25 times, it may be possible to confirm such dirt. Further, in the case where the difference in color or density corresponds to the extent 1, the formed image data are not reduced, whereby a difference in color or density is enabled to be confirmed easily. Further, in the case of the difference in the order of pages, since the correspondence situation can be easily confirmed, the magnification is set constant irrespective of the extent. On the other hand, in the case of the specific image, the correspondence situation can be easily confirmed, and the situation is determined by a choice between two items, i.e., whether to correspond to or not. Accordingly, a classification based on the extent is not performed.

Here, assumption is made to the case where the attribution information producing section 195 compares the formed image data with the specific pattern and judges such that a coincidence exists (YES at Step S104 in FIG. 8). In this case, the control section 101 controls the respective sections so as to process the paper sheet on which an image is formed, in accordance with a predetermined restrictive regulation (Step S105 in FIG. 8). Further, the control section 101 controls the image processing section 140 to reduce the formed image data in accordance with the attribution information (step S105-1 in FIG. 8).

Then, in accordance with a list shown in FIG. 9, since the formed image data correspond to the specific image, the control section 101 makes a reduction ratio to 0.25 times. As a concrete example, the control section 101 controls so as to correlate the reduced formed image data on the page corresponding to the specific image in accordance with the attribution information of "Corresponding to a specific image" with the attribution information, and to store in a state of being attached with the restriction in a folder for the specific image (refer to FIG. 11) in the data memory section 130 (Step S106 in FIG. 8).

Further, when the attribution information producing section 195 compares the formed image data with the specific image and judges such that a coincidence does not exist (NO at Step S104 in FIG. 8), the control section 101 controls the respective sections of the image forming apparatus 100 so as to deliver the paper sheet (printed matter) on which the image is formed, to a sheet delivery section (Step S107 in FIG. 8).

Here, assumption is made to the case where the attribution information producing section 195 compares the formed image data with the original image data and judges such that "dirt" exists (YES at Step S108 in FIG. 8). In this case, the control section 101 refers to the extent information contained in the attribution information (Step S108-1 in FIG. 8), and controls the image processing section 140 to reduce the formed image data in accordance with the extent information (Step S108-2, S108-3, S108-4 in FIG. 8). For example, in accordance with the list shown in FIG. 9, in the case where the dirt corresponds to the extent 1 ("the extent 1" at Step S108-1 in FIG. 8), the control section 101 makes the reduction ratio to 0.75 times (Step S108-2 in FIG. 8). Further, in accordance with the list shown in FIG. 9, in the case where the dirt corresponds to the extent 2 ("the extent 2" at Step S108-1 in FIG. 8), the control section 101 makes the reduction ratio to 0.5 times (Step S108-3 in FIG. 8). Further, in accordance with the list shown in FIG. 9, in the case where the dirt corresponds to the extent 3 ("the extent 3" at Step S108-1 in FIG. 8), the control section 101 makes the reduction ratio to 0.25 times (Step S108-4 in FIG. 8).

That is, as mentioned above, the control section 101 changes the reducing magnification in accordance with the extent information, and controls the image processing section 140 to reduce the formed image data with this reducing magnification. In conformity with this, the control section 101 determines a folder (storage destination) at the time of storing the formed image relating information in the data memory section 130 in accordance with the extent information (step S108-5 in FIG. 8).

As a concrete example, description is given to the case where the attribution information is "Dirt being existing" and the extent information is the extent 3. Here, in accordance with the attribution information of "Dirt being existing", the control section 101 controls so as to correlate the original image data (all the pages) with the formed image data reduced by 0.25 times on the page corresponding to "Dirt being existing" and the attribution information, and to store in "a folder for defect image detection (dirt), a sub folder (the extent 3)" (refer to FIG. 10) in the data memory section 130 (Step S111 in FIG. 8).

Further, assumption is made to the case where the attribution information producing section 195 compares the formed image data with the original image data and judges such that "dirt" does not exist (NO at Step S108 in FIG. 8), but "a difference in color or density" exists (YES at Step S109 in FIG. 8).

In this case, the control section 101 refers to the extent information contained in the attribution information (Step S109-1 in FIG. 8), and controls the image processing section 140 to reduce the formed image data in accordance with the extent information (Step S109-2, S109-3 in FIG. 8). For example, in accordance with the list shown in FIG. 9, in the case where the difference in color or density corresponds to the extent 1 ("the extent 1" at Step S109-1 in FIG. 8), the control section 101 makes the reduction ratio to 1.0 time. Further, in accordance with the list shown in FIG. 9, in the case where the difference in color or density corresponds to the extent 2 ("the extent 2" at Step S109-1 in FIG. 8), the control section 101 makes the reduction ratio to 0.75 times (Step S109-2 in FIG. 8). Further, in accordance with the list shown in FIG. 9, in the case where the difference in color or density corresponds to the extent 3 ("the extent 3" at Step S109-1 in FIG. 8), the control section 101 makes the reduction ratio to 0.5 times (Step S109-3 in FIG. 8).

That is, as mentioned above, the control section 101 changes the reducing magnification in accordance with the extent information, and controls the image processing section 140 to reduce the formed image data with this reducing magnification. In conformity with this, the control section 101 determines a folder (storage destination) at the time of storing the formed image relating information in the data memory section 130 in accordance with the extent information (Step S109-4 in FIG. 8).

As a concrete example, description is given to the case where the attribution information is "Difference being existing in color or density" and the extent information is the extent 1. Here, in accordance with the attribution information of "Difference being existing in color or density", the control section 101 controls so as to correlate the original image data (all the pages) with the formed image data with the equal magnification on the page corresponding to "Difference being existing in color or density" and the attribution information, and to store in "a folder for defect image detection (color and density), a sub folder (the extent 1)" (refer to FIG. 10) in the data memory section 130 (Step S111 in FIG. 8).

Further, assumption is made to the case where the attribution information producing section 195 compares the formed image data with the original image data and judges such that "dirt" does not exist (NO at Step S108 in FIG. 8), and "a difference in color or density" does not exist (NO at Step S109 in FIG. 8), but "a difference in other items" exists (YES at Step S110 in FIG. 8).

In this case, the control section 101 controls the image processing section 140 to reduce the formed image data in accordance with the extent information contained in the attribution information (Step S110-1 in FIG. 8). For example, in accordance with the list shown in FIG. 9, the control section 101 makes the reduction ratio to 0.5 times, and controls the image processing section 140 to reduce the formed image data with this reducing magnification. Here, in the case where the difference exists in the order of pages, since such a situation can be easily confirmed, the magnification is set to constant irrespective of the extent. In conformity with this, the control section 101 determines a folder (storage destination) at the time of storing the formed image relating information in the data memory section 130 in accordance with the extent information (Step S110-2 in FIG. 8).

As a concrete example, description is given to the case where the attribution information is "Difference being existing in other items" and the extent information is the extent 2. Here, in accordance with the attribution information of "Difference being existing in other items", the control section 101 controls so as to correlate the original image data (all the pages) with the formed image data reduced by 0.5 times on the page corresponding to "Difference being existing in other items" and the attribution information, and to store in "a folder for defect image detection (a difference in other items), a sub folder (the extent 2)" (refer to FIG. 11) in the data memory section 130 (Step S111 in FIG. 8).

Further, assumption is made to the case where the attribution information producing section 195 compares the formed image data with the original image data and judges such that "dirt" does not exist (NO at Step S108 in FIG. 8), "a difference in color or density" does not exist (NO at Step S109 in FIG. 8), and "a difference in other items" does not exist (NO at Step S110 in FIG. 8)

Figure 10:
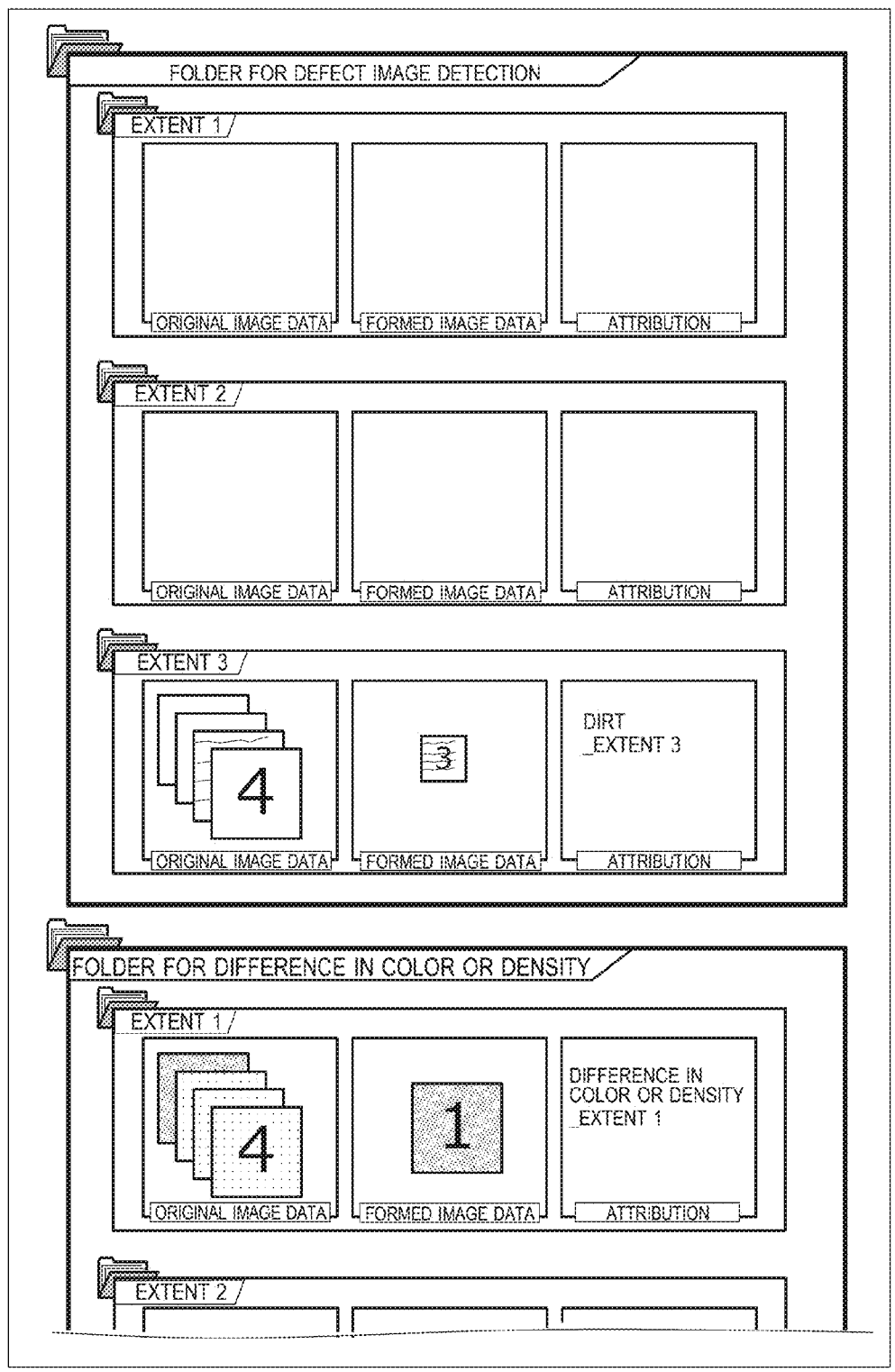
FIG. 10 is an explanatory drawing for explaining an example of operations of the embodiment.
Figure 11:
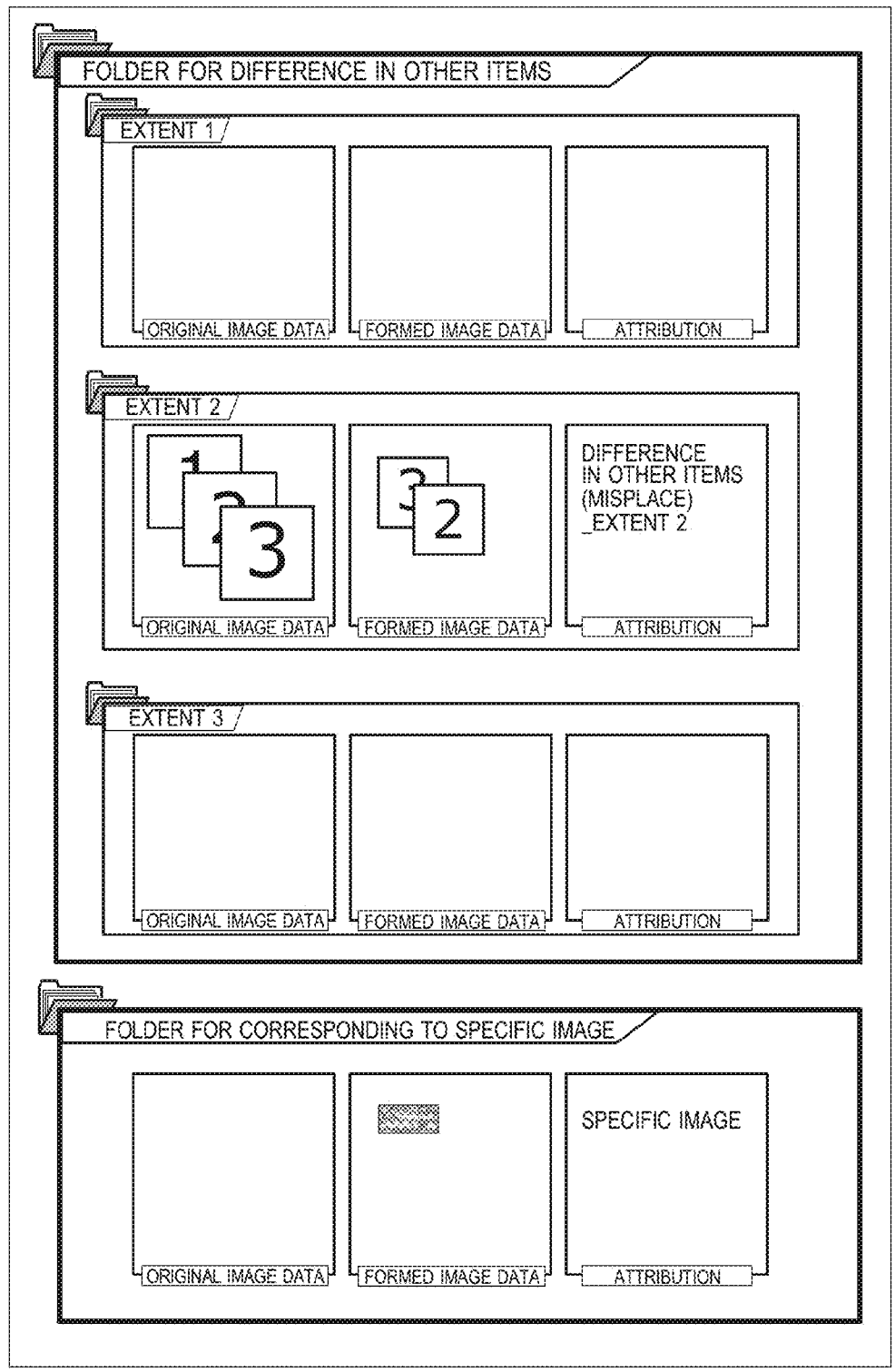
FIG. 11 is an explanatory drawing for explaining an example of operations of the embodiment.

In this case, the control section 101 controls in accordance with the attribution information of "No correspondence" so as to store or not to store any of the formed image relating information in the data memory section 130 in accordance with the setting for the job or the setting corresponding to the attribution information of "No correspondence" (Step S112 in FIG. 8). Since a folder corresponding to the attribution information of "No correspondence" is not prepared, FIG. 10 and FIG. 11 show a concrete example in which the original image data, the formed image data, and the attribution information are not stored in the case of the attribution information of "No correspondence".

[Third Operation Example of an Image Forming Apparatus and an Image Forming System]

Figure 12:
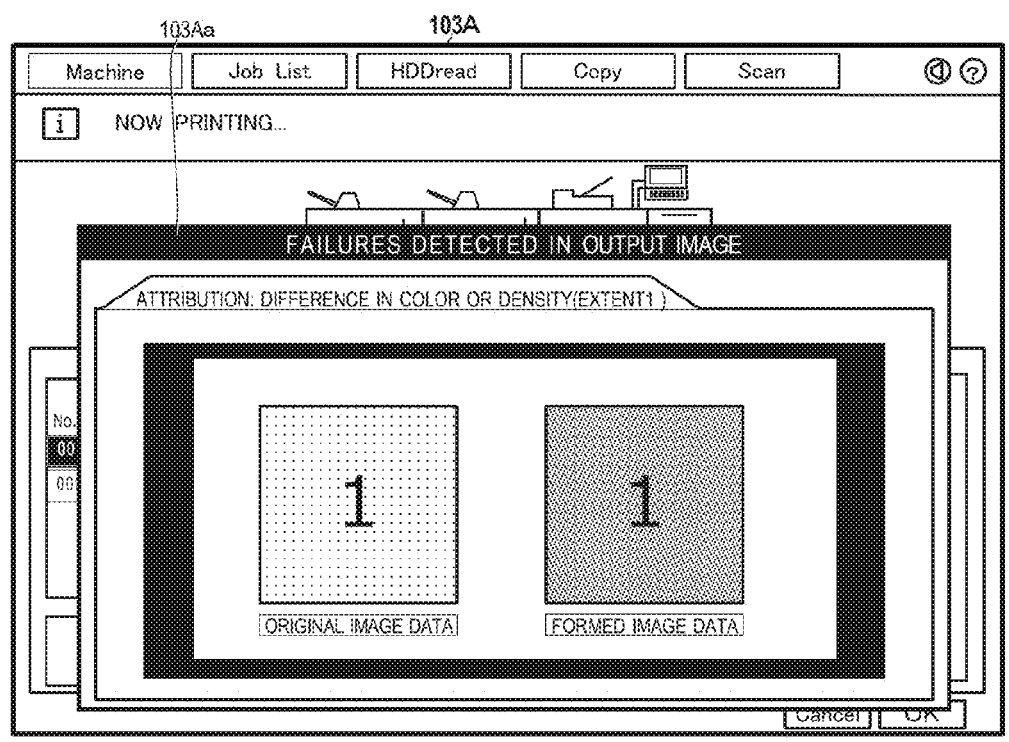
FIG. 12 is explanatory drawing showing an example of a screen display of the embodiment.

Hereafter, description is given to the third operation example of an image forming apparatus and an image forming system with reference to an explanatory drawing for a display screen shown in FIG. 12 and the following figures.

Here, description is given to a display screen in the operation display section 103 in the first operation example and the second operation example which are mentioned above, or a display screen displayed in a printer driver of an external device. The description is continued by using a display screen 103A in the operation display section 103 as a concrete example.

As mentioned above, the control section 101 controls the image forming section 150 so as to form an image on a paper sheet and the output image reading section 190 so as to read out the image on the paper sheet. At this time, when the attribution information producing section 195 detects any one of "Dirt being existing", "Difference being existing in color or density" and "Difference being existing in other items", the attribution information producing section 195 notifies the attribution information to the control section 101.

Here, upon receipt of the notice of the attribution information from the attribution information producing section 195, the control section 101 displays the original image data, the formed image data, and the attribution information on the display 103A with a pop-up screen.

In the concrete example shown in FIG. 12, the attribution information is "Difference being existing in color or density", and the original image data and the formed image data are displayed by being arranged side by side. Here, the original image data and the formed image data are displayed on the pop-up screen 103Aa with the equal magnification corresponding to the extent 1 in accordance with the reduction ratio described in the second operation example.

Figure 13:
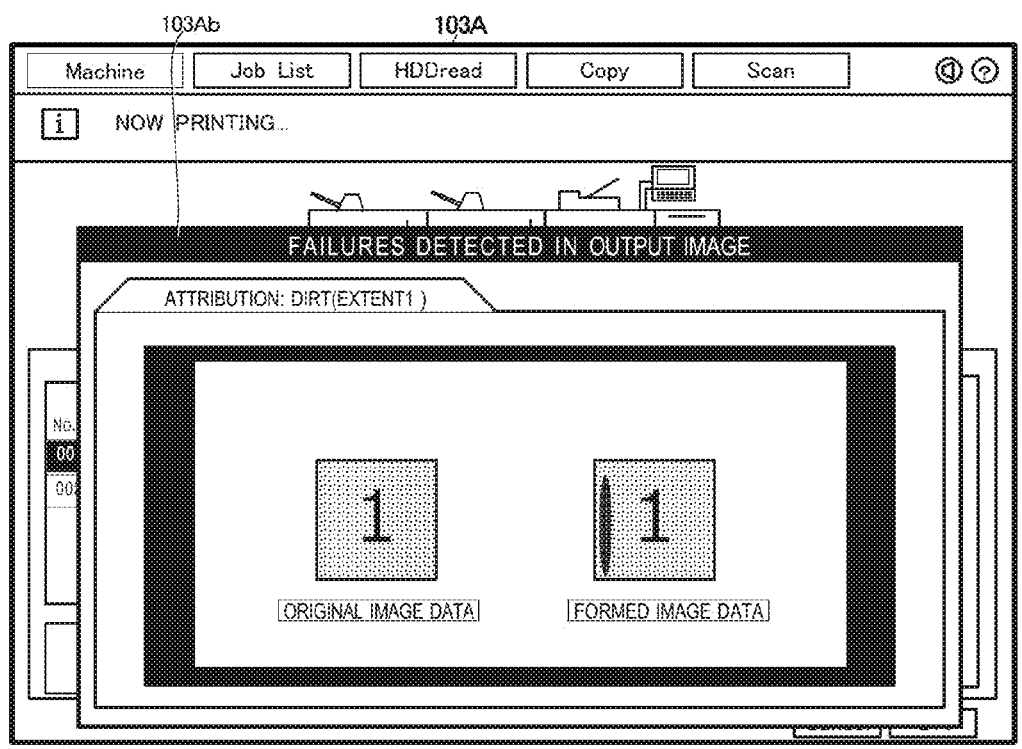
FIG. 13 is explanatory drawing showing an example of a screen display of the embodiment.

In the concrete example shown in FIG. 13, the attribution information is "Dirt being existing", and the original image data and the formed image data are displayed by being arranged side by side. Here, the original image data and the formed image data are displayed on the pop-up screen 103Ab with a reduction ratio of 0.75 times corresponding to the extent 1 in accordance with the reduction ratio described in the second operation example.

Figure 14:
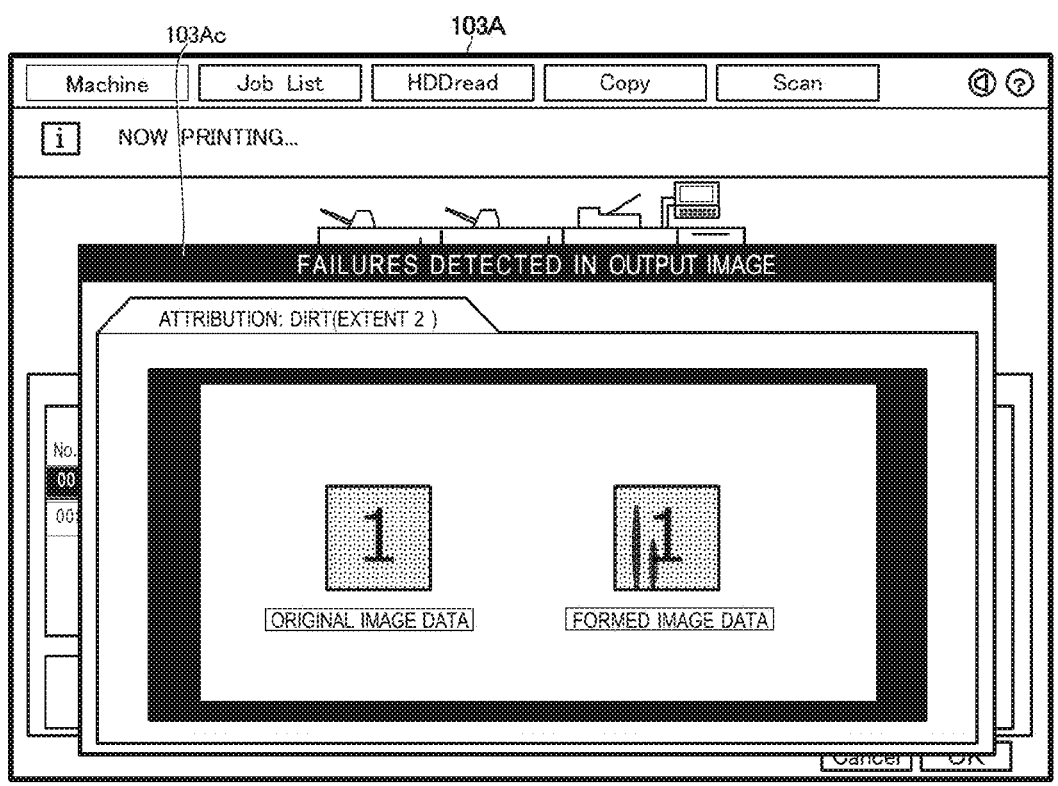
FIG. 14 is explanatory drawing showing an example of a screen display of the embodiment.

In the concrete example shown in FIG. 14, the attribution information is "Dirt being existing", and the original image data and the formed image data are displayed by being arranged side by side. Here, the original image data and the formed image data are displayed on the pop-up screen 103Ac with a reduction ratio of 0.5 times corresponding to the extent 2 in accordance with the reduction ratio described in the second operation example.

Figure 15:
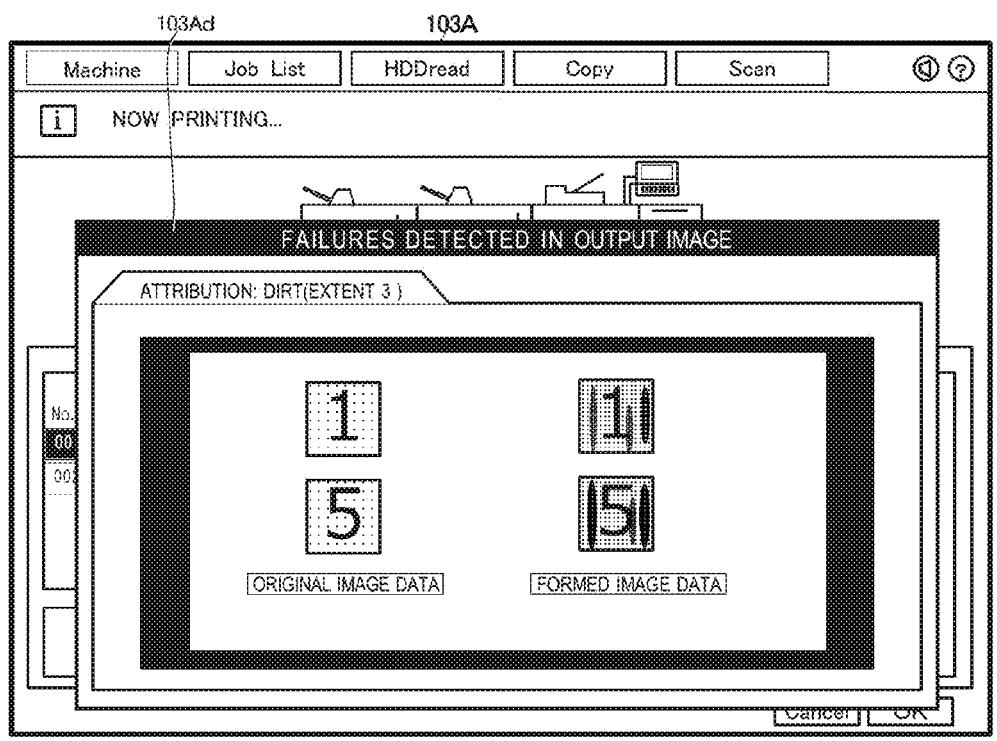
FIG. 15 is explanatory drawing showing an example of a screen display of the embodiment.

In the concrete example shown in FIG. 15, the attribution information is "Dirt being existing", and the original image data and the formed image data are displayed by being arranged side by side. Here, the original image data and the formed image data are displayed on the pop-up screen 103Ad with a reduction ratio of 0.25 times corresponding to the extent 3 in accordance with the reduction ratio described in the second operation example.

In the case of the extent 3, since the image data are reduced by 0.25 times, the control section 101 may control to increase the number of images to be displayed on the pop-up screen 103Ad in accordance with the extent information. That is, in the case of FIG. 12 to FIG. 14, since the extent information is the extent 1 to the extent 2, a single group of two images is displayed, and in the case of FIG. 15, since the extent information is the extent 3, two groups of four images are displayed.

[Fourth Operation Example of an Image Forming Apparatus and an Image Forming System]

It is possible for the control section 101 to control so as to send the display screen data to display the display screen in each of FIG. 12 to FIG. 15 to the printer driver of an external device to which print is designated.

In this case, the control section 101 may send the display screen data corresponding to the pop-up screens 103Aa to 103Ad or minimum data required to produce the display screen data.

[The Effect Acquired by the Embodiment]

According to the above embodiment, the following effects can be acquired.

(1) The data of a formed image (the formed image data) are produced by reading a paper sheet on which an image is formed; attribution information showing the attribute of the formed image data is produced by discriminating the content of the formed image data; and memorizing with regard to formed image relating information relative to the formed image data is controlled based on the attribution information. That is, based on the attribution information corresponding to the content of the formed image data, whether to memorize the formed image relating information (any of the image data, the formed image data, and the attribution information) is controlled as required. In this way, the formed image relating information is made to be memorized based on the attribution information. Accordingly, in the case where the memorizing is needed, the following matters can be grasped without waste. What kind of image has been output from which apparatus, or what kind of image has been tried to be output from which apparatus?

(2) In the above (1), whether to memorize the formed image relating information or not is controlled.

With this, in the case where the memorizing is needed, the following matters can be grasped without waste. What kind of image has been output from which apparatus, or what kind of image has been tried to be output from which apparatus?

(3) In the above (1) to (2), the formed image relating information includes the image data, the formed image data, and the attribution information, and whether to memorize any of the image data, the formed image data, and the attribution information is controlled base on the attribution information. With this, based on the attribution information, in accordance with necessity, whether to memorize any of the image data, the formed image data, and the attribution information is controlled. That is, information needed to be memorized as the formed image relating information is memorized, and the following matters can be grasped without waste. What kind of image has been output from which apparatus, or what kind of image has been tried to be output from which apparatus?

(4) In the above (3), when any multiple items of the image data, the formed image data, and the attribution information are memorized, the multiple items are controlled so as to be memorized in a state of being correlated with each other. With this, information needed to be memorized as the formed image relating information is memorized in a proper state, and the following matters can be grasped without waste. What kind of image has been output from which apparatus, or what kind of image has been tried to be output from which apparatus?

(5) In the above (1) to (4), the attribution information is produced by comparing the image data with the formed image data. With this, it becomes possible to surely detect failures, such as a case where an intended image is not output, and the following matters can be grasped without waste. What kind of image has been output from which apparatus, or what kind of image has been tried to be output from which apparatus?

(6) In the above (1) to (5), the attribution information is produced by comparing a predetermined specific pattern with the formed image data. With this, even in the case of an image prohibited from being output (an output-prohibited image), such as valuable stock certificates, and an image (a careful handling-needed image) to be handled with care, such as secret documents, and the like, in a situation of holding a plurality of image forming apparatuses, it becomes possible to grasp that such an image has been output from which apparatus or has been tried to be output from which apparatus.

(7) In the above (6), the specific pattern is constituted so as to include a pattern corresponding to the whole or a part of a predetermined image, and the attribution information is produced based on whether a coincidence exists between the specific pattern and the formed image data. With this, it become possible to grasp that an output-prohibited image or a careful handling-needed image has been output from which apparatus or has been tried to be output from which apparatus.

(8) In the above (1) to (7), the attribution information is made to include extent information showing an extent of coincidence or non-coincidence by comparing the image data with the formed image data. With this, it becomes possible to surely detect failures including the extent of them, such as a case where an intended image is not output, and the following matters can be grasped without waste. What kind of image has been output from which apparatus, or what kind of image has been tried to be output from which apparatus?

(9) In the above (8), a magnification of the formed image data to be memorized is controlled based on the extent information included in the attribution information. With this, it becomes possible to surely detect failures including the extent of them, such as a case where an intended image is not output, and the formed image data with the magnification necessary for confirming the failures are memorized. Accordingly, the following matters can be grasped without waste. What kind of image has been output from which apparatus, or what kind of image has been tried to be output from which apparatus?

(10) In the above (8), a display magnification at the time of displaying the formed image data is controlled based on the extent information included in the attribution information. With this, it becomes possible to surely detect failures including the extent of them, such as a case where an intended image is not output, and the formed image data with the magnification necessary for confirming the failures are displayed. Accordingly, the following matters can be grasped without waste. What kind of image has been output from which apparatus, or what kind of image has been tried to be output from which apparatus?

(11) In the above (8), the number of displayed images at the time of displaying the formed image data is controlled based on the extent information included in the attribution information. With this, it becomes possible to surely detect failures including the extent of them, such as a case where an intended image is not output, and the formed image data with the number of displayed images and the size necessary for confirming the failures are displayed. Accordingly, the following matters can be grasped without waste. What kind of image has been output from which apparatus, or what kind of image has been tried to be output from which apparatus?

Other Embodiments

Each of the kinds and contents of the attribution information in the above description is merely one example, and should not be limited to the contents used for the description.

Further, each of the folder name, the folder structure, the reducing magnification, and the display screen is also merely one example, and should not be limited to the contents used for the description.

What is claimed is:

1. An image forming apparatus, comprising:
   an image forming section to form an image on a paper sheet based on original image data;
   an output image reader to read the image formed on the paper sheet by the image forming section and to produce formed image data;
   a data memory to memorize various kinds of data;
   a processor configured to:
   discriminate the contents of the formed image data by comparing the formed image data with the original image data to determine if there is a difference between the formed image data and the original image data, and to produce attribution information which shows the attribute of the formed image data; and
   control image formation by the image forming section, reading by the output image reader, and the memorizing by the data memory;
   wherein the processor controls the data memory and determines whether or not to make the data memory memorize formed image relating information including the original image data, the formed image data, and the attribution information, in a respective folder for each of the attribution information, based on the determination of whether there is a difference between the formed image data and the original image data.

2. The image forming apparatus according to claim 1, wherein when the original image data, the formed image data, and the attribution information are memorized in the data memory, the processor controls the multiple items so as to be memorized in a state of being correlated with each other.

3. The image forming apparatus according to claim 1, wherein the processor is configured to produce the attribution information by comparing the original image data with the formed image data.

4. The image forming apparatus according to claim 1, wherein the processor is configured to produce the attribution information by comparing a predetermined specific pattern with the formed image data.

5. The image forming apparatus according to claim 4, wherein the specific pattern is constituted so as to include a pattern corresponding to the whole or a part of a predetermined image, and the processor is configured to produce whether a coincidence exists between the specific pattern and the formed image data or not as the attribution information.

6. The image forming apparatus according to claim 1, wherein the processor is configured to compare the original image data with the formed image data and makes the attribution information include extent information showing an extent of coincidence or non-coincidence.

7. The image forming apparatus according to claim 6, wherein the processor is configured to control a magnification of the formed image data to be memorized in the data memory based on the extent information included in the attribution information.

8. The image forming apparatus according to claim 6, further comprising a display screen to display various kinds of information, wherein the processor is configured to control a display magnification at the time of displaying the formed image data on the display screen based on the extent information included in the attribution information.

9. The image forming apparatus according to claim 6, further comprising a display screen to display various kinds of information, wherein the processor is configured to control the number of displayed images at the time of displaying the formed image data on the display screen based on the extent information included in the attribution information.

10. An image forming system, comprising:
    the image forming section described in claim 1;
    the output image reader described in claim 1;
    the data memory described in claim 1; and
    the processor described in claim 1;
    wherein the image forming section, the output image reader, the data memory, and the processor are connected.

11. An image formation control method for controlling image formation in an image forming apparatus, wherein the image forming apparatus includes an image forming section to form an image on a paper sheet based on original image data; an output image reader to read the image formed on the paper sheet by the image forming section and to produce formed image data; a data memory to memorize various kinds of data; a processor configured to discriminate the contents of the formed image data by comparing the formed image data with the original image data to determine if there is a difference between the formed image data and the original image data, and to produce attribution information which shows the attribute of the formed image data, and to control image formation by the image forming section, reading by the output image reader, and memorizing by the data memory,
    the image formation control method comprising:
    a step of determining whether or not to control the data memory to memorize formed image relating information including the original image data, the formed image data, and the attribution information, in a respective folder for each of the attribution information, based on the determination of whether there is a difference between the formed image data and the original image data.

12. The image formation control method according to claim 11, wherein when the original image data, the formed image data, and the attribution information are memorized in the data memory, the multiple items are memorized in a state of being correlated with each other.

13. The image formation control method according to claim 11, wherein the attribution information is produced by comparing the original image data with the formed image data.

14. The image formation control method according to claim 11, wherein the attribution information is produced by comparing a predetermined specific pattern with the formed image data.

15. The image formation control method according to claim 14, wherein the specific pattern is constituted so as to include a pattern corresponding to the whole or a part of a predetermined image, and the attribution information is produced to include whether a coincidence exists between the specific pattern and the formed image data or not.

16. The image formation control method according to claim 11, wherein the original image data are compared with the formed image data, extent information showing an extent of coincidence or non-coincidence is produced by the comparison, and the extent information is included in the attribution information.

17. The image formation control method according to claim 16, wherein a magnification of the formed image data to be memorized in the data memory is controlled based on the extent information included in the attribution information.

18. The image formation control method according to claim 16, wherein the image forming apparatus further comprises a display screen to display various kinds of information, and a display magnification at the time of displaying the formed image data on the display screen is controlled based on the extent information included in the attribution information.

19. The image formation control method according to claim 16, wherein the image forming apparatus further comprises a display screen to display various kinds of information, and the number of displayed images at the time of displaying the formed image data on the display screen is controlled based on the extent information included in the attribution information.

* * * * *